(12) United States Patent
Maeshima

(10) Patent No.: US 11,148,427 B2
(45) Date of Patent: Oct. 19, 2021

(54) COUPLING STRUCTURE AND IMAGE FORMING APPARATUS

(71) Applicant: KYOCERA Document Solutions Inc., Osaka (JP)

(72) Inventor: Masanobu Maeshima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 236 days.

(21) Appl. No.: 16/599,873

(22) Filed: Oct. 11, 2019

(65) Prior Publication Data

US 2020/0122473 A1    Apr. 23, 2020

(30) Foreign Application Priority Data

Oct. 22, 2018  (JP) .............................. JP2018-198573

(51) Int. Cl.
*B41J 2/175*   (2006.01)
*C09D 11/36*   (2014.01)
*F17C 13/04*   (2006.01)

(52) U.S. Cl.
CPC ....... *B41J 2/17523* (2013.01); *B41J 2/17513* (2013.01); *B41J 2/17556* (2013.01); *B41J 2/17566* (2013.01); *C09D 11/36* (2013.01); *F17C 13/04* (2013.01)

(58) Field of Classification Search
CPC ... B67D 7/0294; F17C 13/04; B05B 11/3025; B41J 2/17513; B41J 2/17523; B41J 2/17596
See application file for complete search history.

(56) References Cited

U.S. PATENT DOCUMENTS

| 5,555,673 | A | * | 9/1996 | Smith | A01M 21/043 |
| | | | | | 118/270 |
| 5,856,840 | A | * | 1/1999 | Barinaga | B41J 2/17553 |
| | | | | | 347/86 |
| 6,286,949 | B1 | * | 9/2001 | Lewis | B41J 2/17553 |
| | | | | | 347/86 |
| 6,290,343 | B1 | * | 9/2001 | Lewis | B41J 2/175 |
| | | | | | 347/85 |
| 2002/0196312 | A1 | * | 12/2002 | Ishizawa | B41J 2/1752 |
| | | | | | 347/50 |

(Continued)

FOREIGN PATENT DOCUMENTS

JP    2007038537 A    2/2007

*Primary Examiner* — John Zimmermann
(74) *Attorney, Agent, or Firm* — Studebaker & Brackett PC

(57) ABSTRACT

A coupling structure which couples an ink container to a supply target includes a cap and a joint. The cap includes a container side communication path and a container opening/closing valve. The container side communication path is communicated with a supply port. The container opening/closing valve opens and closes the supply port. The joint includes a main body side communication path, a main body opening/closing valve and a first biasing member. The main body side communication path is communicated to an inflow port. The main body opening/closing valve opens and closes the inflow port. The first biasing member biases the main body opening/closing valve to a side of the ink container. The main body opening/closing valve is protruded to a side of the ink container closer than the inflow port even if the first biasing member is mostly contracted.

6 Claims, 11 Drawing Sheets

(56) References Cited

U.S. PATENT DOCUMENTS

| | | | |
|---|---|---|---|
| 2006/0237067 A1* | 10/2006 | Lee | F17C 13/12 |
| | | | 137/588 |
| 2010/0020144 A1* | 1/2010 | McCracken | B21K 1/24 |
| | | | 347/88 |
| 2011/0197991 A1* | 8/2011 | Ender | B41J 2/17513 |
| | | | 141/23 |
| 2019/0381799 A1* | 12/2019 | Ueno | B41J 2/17596 |

* cited by examiner

FIG. 7

COUPLING STRUCTURE AND IMAGE FORMING APPARATUS

INCORPORATION BY REFERENCE

This application is based on and claims the benefit of priority from Japanese patent application No. 2018-198573 filed on Oct. 22, 2018, which is incorporated by reference in its entirety.

BACKGROUND

The present disclosure relates to a coupling structure coupling an ink container to a supply target to which an ink is supplied and an image forming apparatus including the coupling structure.

In an inkjet type image forming apparatus, a recording head ejects an ink on a recording medium, such as a paper sheet, to form an image on the recording medium. The image forming apparatus is provided with an ink container storing the ink, and the ink is supplied from the ink container to the recording head which is a supply target. It is required for the ink container to prevent ink leakage during ink supplying or during transportation.

A ink cartridge (the ink container) is sometimes configured such that an ink supplying port formed in a container is closed with a seal. In the ink cartridge, an ink supplying needle communicated with the recording head is made to penetrate through the seal and to supply the ink from the container to the recording head through the ink supplying needle.

In the case where the seal is used, when the ink supplying needle penetrates through the seal, the seal piece broken by the ink supplying needle may be mixed with the ink in the container as a foreign matter. Additionally, because it is difficult to make the ink supplying port large, there is a problem that a supplying amount of the ink is restricted.

SUMMARY

In accordance with an aspect of the present disclosure, a coupling structure which couples an ink container to a supply target to which an ink is suppled from the ink container includes a cap and a joint. The cap closes a spout of the ink container. The joint is attached to a receiving port of the supply target. The cap includes a container side communication path and a container opening/closing valve. The container side communication path is communicated with a supply port through which the ink is supplied to the supply target. The container opening/closing valve opens and closes the supply port. The joint includes a main body side communication path, a main body opening/closing valve and a first biasing member. The main body side communication path is communicated to an inflow port in which the ink is flowed from the ink container. The main body opening/closing valve opens and closes the inflow port and is protruded to a side of the ink container closer than the inflow port. The first biasing member biases the main body opening/closing valve to a side of the ink container. The main body opening/closing valve is protruded to a side of the ink container closer than the inflow port even if the first biasing member is mostly contracted. When the cap is coupled to the joint, the main body opening/closing valve comes into contact with the container opening/closing valve, and is pushed in against a biasing force of the first biasing member to open the inflow port. After the main body opening/closing valve is pushed in until a state where the first biasing member is mostly contracted, the main body opening/closing valve pushes the container opening/closing valve in to open the supply port. The container side communication path is communicated with the main body side communication path such that the ink container is coupled to the supply target.

In accordance with an aspect of the present disclosure, an image forming apparatus includes the ink container and the supply target which are coupled to each other by the coupling structure and an image forming part which forms an image using the ink supplied to the supply target from the ink container.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 7 is a cross sectional view showing a coupling structure (in a state where a connection part of the cap is inserted into a connection cylinder of the joint) according to the embodiment of the present disclosure.

DETAILED DESCRIPTION

Hereinafter, a coupling structure and an image forming apparatus according to an embodiment of the present disclosure will be described with reference to the drawings.

Figure 1:
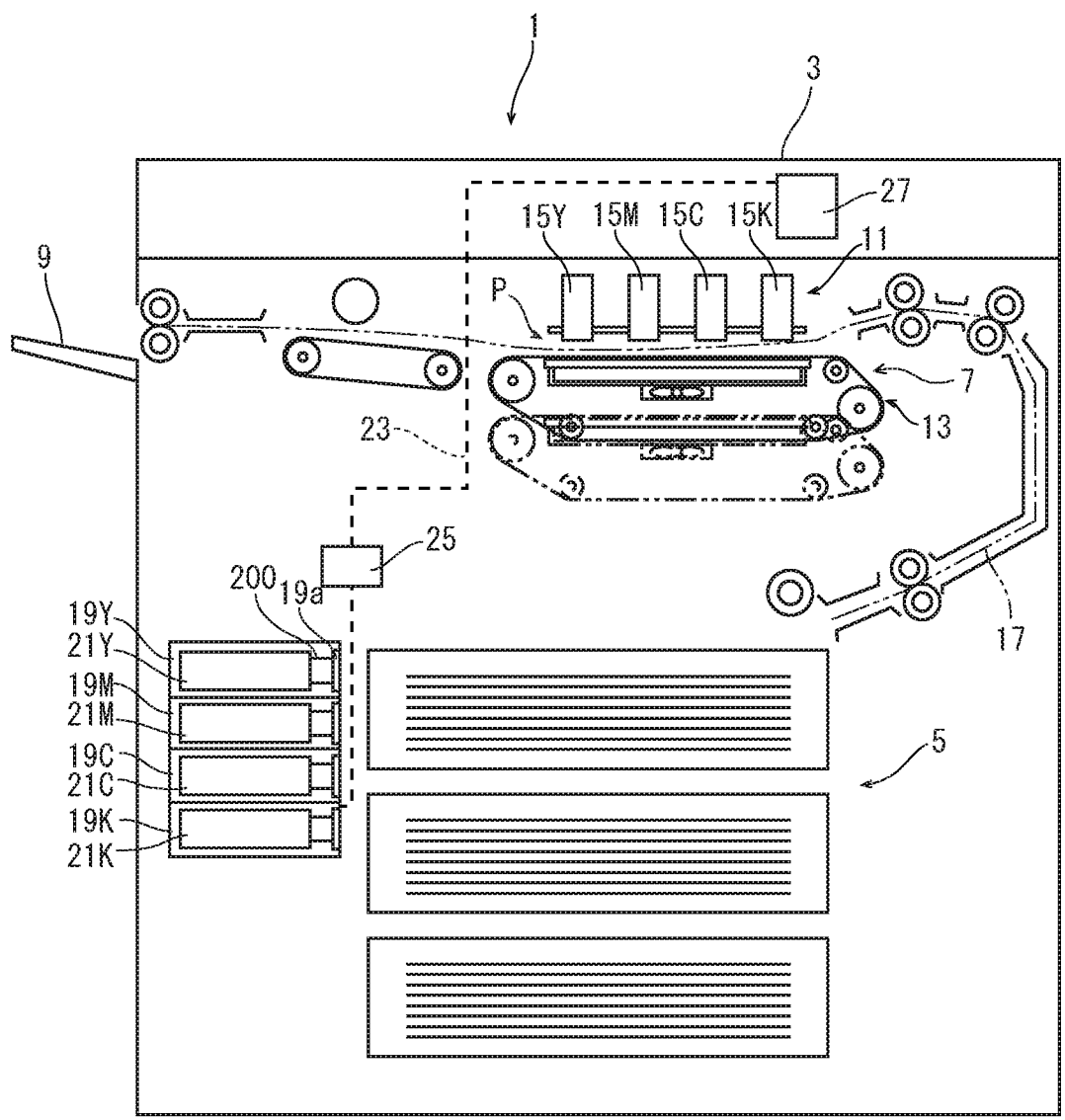
FIG. 1 is a front view schematically showing an inner structure of a printer according to one embodiment of the present disclosure.

Firstly, with reference to FIG. 1, an entire structure of a printer 1 as the image forming apparatus will be described. For convenience for explanation, a near side (a front side) of a paper surface of FIG. 1 is defined to be a front side of the printer 1. In each figure, L, R, U and Lo respectively show a left side, a right side, an upper side and a lower side of the printer 1.

An apparatus main body 3 of the printer 1 is provided with a sheet feeding part 5, an inkjet type image forming part 7 and a discharge tray 9. The sheet feeding part 5 is disposed in a lower portion of the apparatus main body 3, and includes a plurality of sheet feeding cassettes which store a sheet and a plurality of sheet feeding devices which feed the sheet from the respective sheet feeding cassettes. The image forming part 7 is disposed above the sheet feeding part 5, and includes a head unit 11 and a conveyance unit 13.

The head unit 11 includes four recording heads 15 (15K, 15C, 15M and 15Y) corresponding to four colors (black, cyan, magenta and yellow) respectively. The four recording heads 15 are disposed side by side in the left-and-right direction. The conveyance unit 13 is supported so as to be upwardly and downwardly moved between an upper position close to the head unit 11 and a lower position separate from the head unit 11. When a printing operation is performed, the head unit 13 is moved upwardly to form an image forming path P between the head unit 11 and the conveyance unit 13 from the right side to the left side in FIG. 1. In the apparatus main body 3, a conveyance path 17 for the sheet is formed from the sheet feeding part 5 to the discharge tray 9 through the image forming path P.

In the apparatus main body 3, four ink container storage parts 19 (19K, 19C, 19M and 19Y) are formed side by side in the upper-and-lower direction. The four ink container storage parts 19K, 19C, 19M and 19Y store ink containers 21K, 21C, 21M and 21Y containing black, cyan, magenta and yellow inks, respectively. The ink container will be described later. Each ink container storage part 19 has a receiving port 19a to which the ink is suppled from the ink container 21. The receiving port 19a is connected to the head unit 11 through an ink supply path 23. The ink supply path 23 is provided with a pump 25 and a sub-tank 27 in the order from the upstream side in the ink supply direction.

When the ink container 21 is stored in the corresponding ink storage part 19, the ink container 21 is connected to the receiving port 19a by a coupling structure 200. The coupling structure 200 will be described later. Then, when the pump 25 is driven, the ink is supplied to the ink supply path 23 from the ink container 21 through the receiving port 19a. After that, after stored in the sub-tank 27 temporarily, the ink is supplied to the corresponding recording head 15. That is, the recording head 15 is a supply target to which the ink is supplied from the ink container 21.

Next, a printing operation (an image forming operation) of the printer 1 having the above configuration will be described. When the printer 1 receives an image data from an external computer or the others, the sheet is fed from the sheet feeding part 5 to the conveyance path 17. Then, when the sheet passes the image forming path P, each recording head 15 ejects the ink based on the image date, and a color ink image is formed on the sheet. The color ink image is dried by a dryer (not shown) while the sheet is being conveyed along the conveyance path 17. After that, the sheet is discharged to the discharge tray 9.

Figure 2:
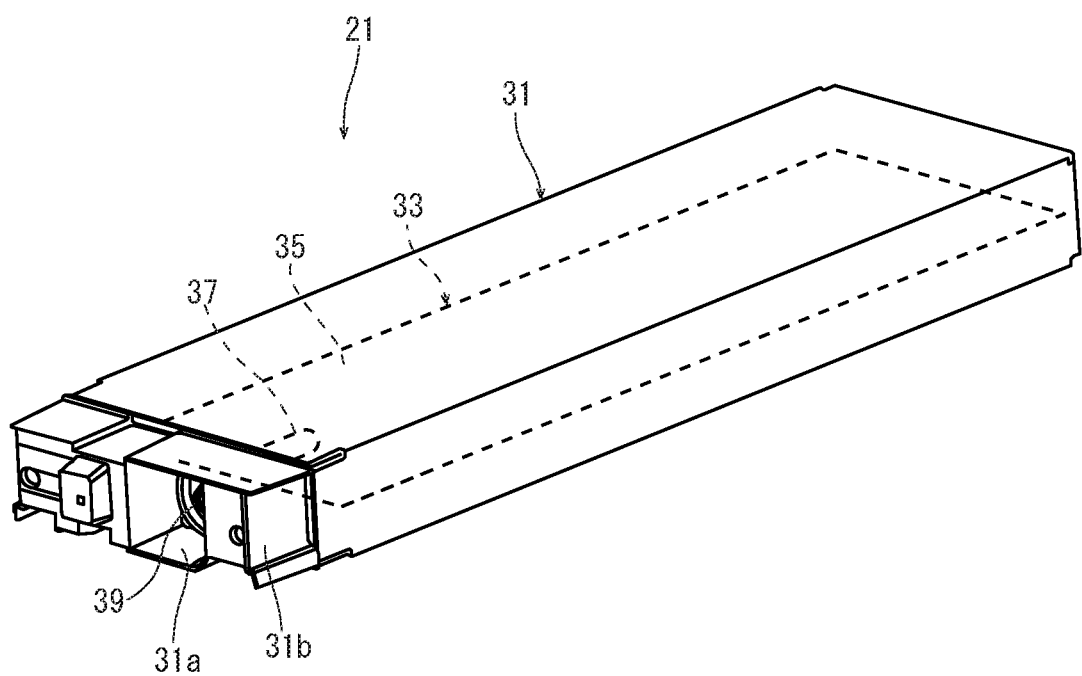
FIG. 2 is a perspective view showing an ink container, in the printer according to the embodiment of the present disclosure.

Next, the ink container 21 will be described with reference to FIG. 2. FIG. 2 is a perspective view showing the ink container. The four ink containers 21K, 21C, 21M and 21Y have the same structure, and one ink container among them will be described in the following description.

The ink container 21 includes a case 31 and an ink pack 33 stored in the case 31.

The case 31 is formed in a shallow parallelepiped box-like shape having a size capable of being stored in the ink container storage part 19. On one end face of the case 31, a rectangular opening 31a is formed. Around the opening 31a, a rectangular cylindrical attachment wall 31b is formed. On the other end face of the case 31, an insertion opening (not shown) through which the ink pack 33 is attached is formed.

Figure 3:
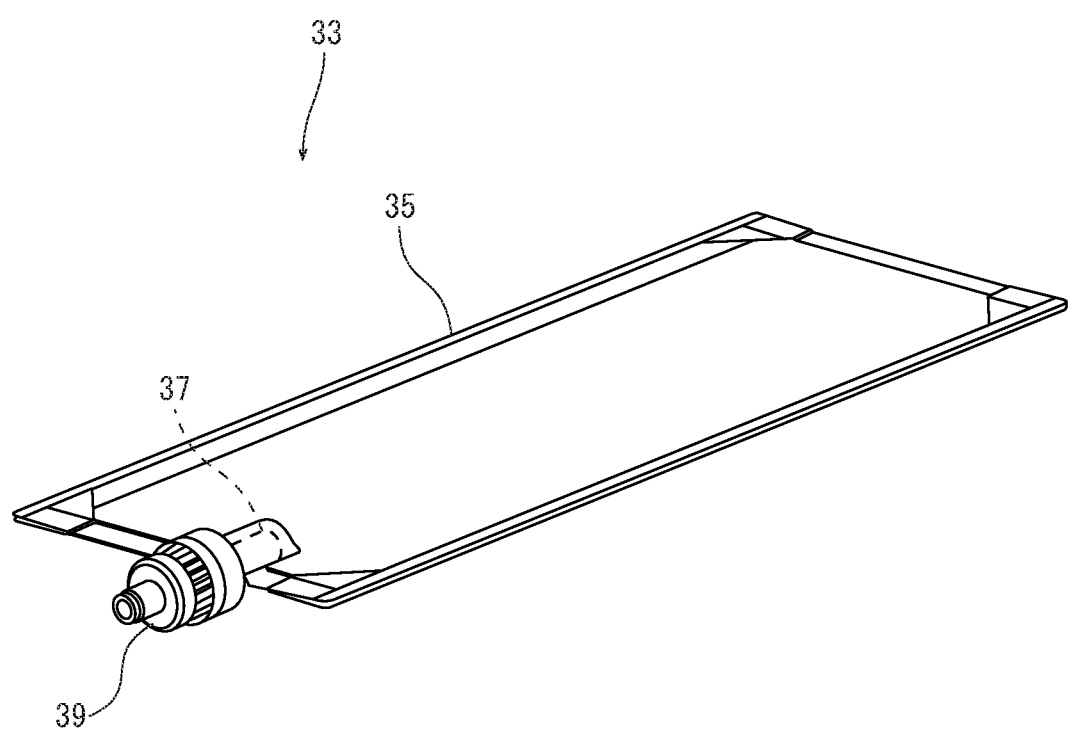
FIG. 3 is a perspective view showing an ink pack, a spout and a cap of the ink container, in the printer according to the embodiment of the present disclosure.
Figure 4:
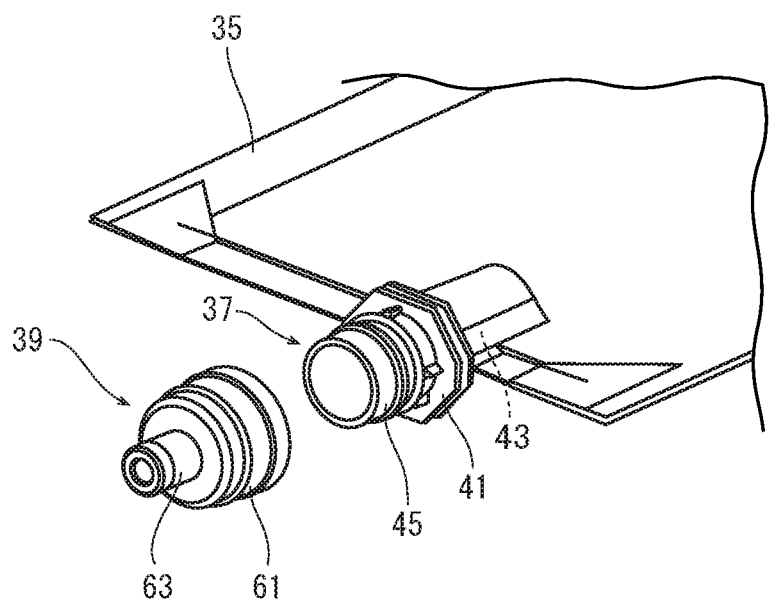
FIG. 4 is a perspective view showing the spout and the cap of the ink container, in the printer according to the embodiment of the present disclosure.

The ink pack 33 will be described with reference to FIG. 2, FIG. 3 and FIG. 4. FIG. 3 is a perspective view showing the ink pack and FIG. 4 is a perspective view showing one end portion of the ink pack.

The ink pack 33 includes a bag body 35, a spout 37 and a cap 39. As shown in FIG. 3, the bag body 35 is a gusset type bag formed by rectangular upper and lower films, and a pair of side films. Each side film is folded along the longitudinal center line. The films are connected to each other by welding. When the bag body 35 is filled with the ink, the folded side films are unfolded and the bag body 35 is expanded to an approximately parallelepiped shape. At this time, by a length of the unfolded portion of the side films, the bag body 35 is reduced in length. On the other hand, when the ink is discharged, the side films are folded, the upper and lower films are overlapped with each other, and the bag body 35 is increased in length.

Each film is made of flexible film material. The film material is formed by laminating two or more layers, such as resin and aluminum. For example, the film material is formed by laminating a polyester layer, an aluminum layer, a nylon layer and a low density polyethylene layer in the order from the front side. Using the polyester layer as a front side layer improves an appearance and a strength of the bag body 35. Using the aluminum layer improves a gas barrier performance of the bag body 35 to heighten an ink storage performance. Using the nylon layer improves a mechanical strength and an impact resistance of the bag body 35. Using the low density polyethylene layer or a polypropylene layer as a back side layer (the innermost layer) heightens a welding strength when the films are formed in a bag-shape by welding, and improves a seal performance.

The spout 37 is held between one end portions of the upper film and the lower film of the bag body 35, and welded to both the films. The cap 39 closes the spout 37. The spout 37 and the cap 39 will be described later.

When the ink pack 33 is stored in the case 31 through the insertion opening, as shown in FIG. 2, the spout 37 closed by the cap 39 is exposed through the opening 31a of the case 31.

Figure 5:
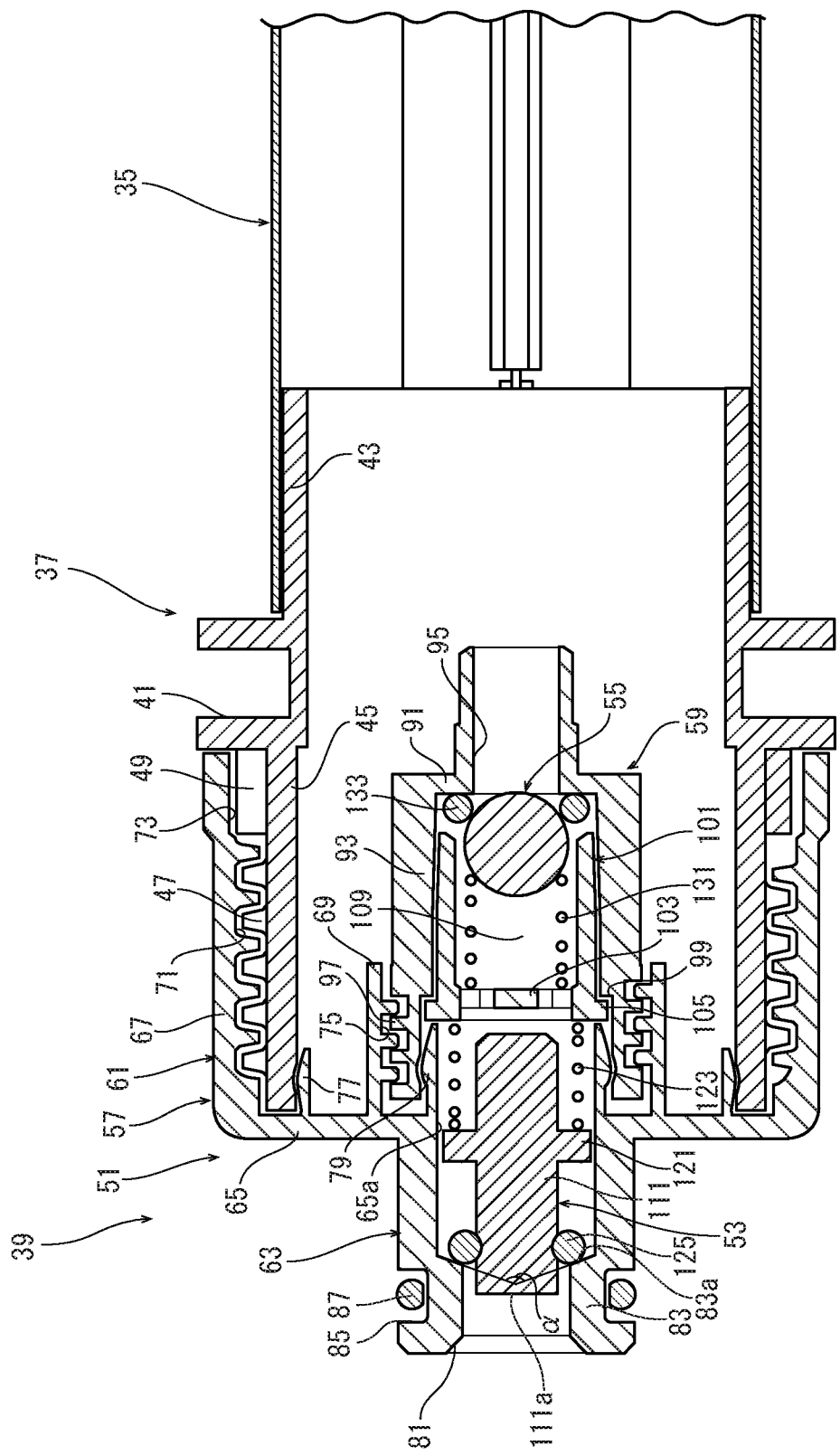
FIG. 5 is a cross sectional view showing the spout and the cap of the ink container, in the printer according to the embodiment of the present disclosure.

Next, with reference to FIG. 4 and FIG. 5, the spout 37 and the cap 39 will be described. FIG. 5 is a cross sectional view showing the spout and the cap.

Firstly, the spout 37 will be described. The spout 37 is a cylindrical member having a hollow space. The spout 37 has a fixed part 41 fixed to the case 31. The fixed part 41 is formed on the approximately axial center portion of the outer circumferential face along the circumferential direction. The fixed part 41 has two ribs formed at intervals in the axial direction. A fixed part (not shown) of the case 31 is held between the two ribs. Then, the spout 37 is fixed to the case 31.

The spout 37 has a container side end part 43 on one side of the fixed part 41 and a cap side end part 45 on the other side of the fixed part 41. As shown in FIG. 4, the container side end part 43 is held between the upper film and the lower film of the bag body 35 and welded to both the films. This communicates the inside of the bag body 35 with the hollow space of the spout 37. As shown in FIG. 5, on the outer circumferential face of the cap side end part 45, a first male screw 47 and a protruded portion 49 are formed. The protruded portion 49 is formed adjacent to the fixed part 41 on a part of the outer circumferential face along the circumferential direction. The first male screw 47 is formed around the outer circumferential face on the tip end side of the protruded portion 49 (on an opposite side to the bag body 35).

Next, the cap 39 will be described. As shown in FIG. 5, the cap 39 includes a cap main body 51, a container opening/closing valve 53 and a backflow prevention valve 55 which are stored in the cap main body 51.

Firstly, the cap main body 51 will be described. The cap main body 51 includes a main body 57 and a sub-main body 59 which is assembled to the main body 57.

The main body 57 has an attachment part 61 attached to the spout 37 and a connection part 63 connected to the ink container storage part 19 (refer to FIG. 4).

The attachment part 61 is formed in a bottomed cylindrical shape, and has an end wall 65, an outer cylindrical wall 67 and an inner cylindrical wall 69. The end wall 65 has a flat ring-shape having a circular opening 65a at the center portion. The end wall 65 has an outer diameter slightly larger than an outer diameter of the cap side end part 45 of the spout 37.

The outer cylindrical wall 67 is formed along the outer circumference of the end wall 65. On the inner circumferential face of the outer cylindrical wall 67, a first female screw 71 and a recess 73 are formed. The first female screw 71 is capable of being meshed with the first male screw 47 of the spout 37. The recess 73 is engageable with the protruded portion 49 of the spout 37.

The inner cylindrical wall 69 is formed around the opening 65a slightly outside the opening 65a. The inner cylindrical wall 69 has a length shorter than a length of the outer cylindrical wall 67. Around the inner circumferential face of the inner cylindrical wall 69, a second female screw 75 is formed.

The attachment part 61 has further an outer seal 77 and an inner seal 79 which are formed on the end wall 65. The outer seal 77 is formed in a cylindrical shape inside the outer cylindrical wall 67 via a small gap. When the first male screw 47 of the spout 37 is meshed with the first female screw 71 of the outer cylindrical wall 67, the outer seal 77 tightly comes into contact with the inner circumferential face of the cap side end part 45. Thereby, a gap between the cap main body 51 and the spout 37 are liquid-tightly sealed so as to prevent leakage of the ink. The inner seal 79 is formed in a cylindrical shape along the opening 65a of the end wall 65 via a small gap with the inner cylindrical wall 69.

The connection part 63 is formed in a cylindrical shape along the opening 65a of the end wall 65. A tip opening of the connection part 63 forms an ink supply port 81. On the inner circumferential face of the tip end portion of the connection part 63, a protrusion 83 is formed. The protrusion 83 is annularly formed inside the supply port 81 along the circumferential direction. The inner side end face 83a of the protrusion 83 (the face on an opposite side to the supply port 81) is inclined to be tapered toward the supply port 81. In a cross sectional view along the axial direction of the connection part 63, imaginary lines extending the end face 83a are crossed at a tapered angle α of 120°. On the outer circumferential face of the tip end portion of the connection part 63, a recess is annularly formed along the circumferential direction. In the recess 85, an O-ring 87 is stored.

The sub-main body 59 has a bottomed cylindrical shape, and has a circular end wall 91 and a cylindrical circumferential wall 93. The end wall 91 has a cylindrical inflow port 95 at the center portion. The circumferential wall 93 has a predetermined inner diameter and a predetermined outer diameter. The inner diameter is almost equal to a diameter of the opening 65a of the end wall 65 of the main body 57. The outer diameter is smaller than an inner diameter of the inner cylindrical wall 69 of the main body 57. Around the outer circumferential face of the circumferential wall 93, a second male screw 97 is formed on the opposite side end portion to the inflow port 95. The second male screw 97 is capable of being meshed with the second female screw 75 of the inner cylindrical wall 69 of the main body 57. On the inner circumferential face of the circumferential wall 93, a step portion 99 is protruded inwardly along the circumferential direction.

In the sub-main body 59, an auxiliary cylinder 101 is stored. The auxiliary cylinder 101 has an outer diameter smaller than an inner diameter of the circumferential wall 93 of the sub-main body 59. In the one end side opening of the auxiliary cylinder 101, a grid stopper 103 is formed. On the outer circumferential face of the auxiliary cylinder 101, an annular portion 105 is protruded outwardly around the one end side opening. The auxiliary cylinder 101 is stored in the sub-main body 59, and the annular portion 105 comes into contact with the step portion 99.

The sub-main body 59 is assembled to the main body 57 by meshing the second male screw 97 with the second female screw 75 of the inner cylinder wall 69 of the main body 57. At this time, the inner seal 79 of the main body 57 enters inside the circumferential wall 93 of the sub-main body 59 and comes into contact with the inner circumferential face of the circumferential wall 93. The tip end of the inner seal 79 comes into contact with the annular portion 105 of the auxiliary cylinder 101. Thereby, a gap between the main body 57 and the sub-main body 59 are liquid-tightly sealed. When the main body 57 and the sub-main body 59 are assembled, a container side communication path 109 is formed from the inflow port 95 of the sub-main body 59 through the hollow space of the sub-main body 59 (the hollow space of the auxiliary cylinder 101) and the hollow space of the connection part 63 to the supply port 81 of the connection part 63.

Next, the container opening/closing valve 53 will be described. The container opening/closing valve 53 includes an approximately columnar main body 111 and an O-ring 125 as an annular elastic member. The main body 111 has a length shorter than a length between the annular portion 105 of the auxiliary cylinder 101 stored in the sub-main body 59 of the cap main body 51 and the supply port 81 of the connection part 63. The main body 111 has an outer diameter smaller than an inner diameter of the protrusion 83. Around the approximately axial center portion of the outer circumferential face of the main body 111, an annular flange 121 is formed. The flange 121 has an outer diameter smaller than an inner diameter of the connection part 63 and larger than an inner diameter of the protrusion 83. The O-ring 125 is attached around the end portion of the outer circumferential face of the main body 111 on a side of the tip end face 111a of the main body 111.

The container opening/closing valve 53 is stored in the connection part 63 with the tip end face 111a of the main body 111 on the side of the supply port 81. Between the flange 121 of the container opening/closing valve 53 and the annular portion 105 of the auxiliary cylinder 101 stored in the sub-main body 59, a valve biasing spring 123 is disposed. The valve biasing spring 123 biases the container opening/closing valve 53 toward the supply port 81 with respect to the auxiliary cylinder 101 (the sub-main body 59), and the O-ring 125 comes into contact with the end face 83a of the protrusion 83. Then, the container opening/closing valve 53 closes the supply port 81.

Next, the ball 55 as a backflow prevention valve 55 will be described. The ball 55 is a spherical member having a diameter smaller than an inner diameter of the auxiliary cylinder 101 stored in the sub-main body 59 and larger than an inner diameter of the inflow port 95.

The ball 55 is stored in the auxiliary cylinder 101. Between the stopper 103 of the auxiliary cylinder 101 and the ball 55, a ball biasing spring 131 is disposed. The ball 55 is biased by the ball biasing spring 131 toward the inflow port 95, and comes into contact with the end wall 91 of the sub-main body 59 via an O-ring 133. Then, the ball 55 closes the inflow port 95.

When the spout 37 is closed by the cap 39 having the above described configuration, the attachment part 61 of the cap 39 is attached to the cap side end part 45 of the spout 37, and then the cap 39 is turned in a closing direction with respect to the spout 37. Then, the first male screw 47 is meshed with the first female screw 71, and the cap 39 is attached to the spout 37. The protruded portion 49 is inserted in the recess 73 to prevent the cap 39 from being turned in an opening direction with respect to the spout 37.

Next, a way to fill the above described ink pack 33 with the ink will be described. Firstly, in a state where the cap 39 is detached, the bag body 35 is filled with the ink through the spout 37. At this time, the ink is filled in the hollow space of the spout 37. Then, the cap 39 is attached to the spout 37 by meshing the first female screw 71 of the cap 39 with the first male screw 47 of the spout 37. At this time, as described above, the gap between the attachment part 61 of the cap 39 and the cap side end part 45 of the spout 37 are liquid-tightly sealed by the outer seal 77.

In the cap 39, as described above, the container opening/closing valve 53 is biased by the valve biasing spring 123 toward the supply port 81, and the O-ring 125 comes into contact with the end face 83a of the protrusion 83 to close the supply port 81. The ball 55 is biased by the ball biasing spring 131 toward the inflow port 95, and comes into contact with the end wall 91 of the sub-main body 59 via the O-ring 133 to close the inflow port 95. That is, the container side communication path 109 between the container opening/closing valve 53 and the ball 55 is hollow.

Next, by using an air vent tool, air is removed from the ink pack 33. The air vent tool includes a needle and a suction pump, for example. The needle is formed to be connected to the connection part 63 of the cap 39 and insertable in the container side communication path 109 through the supply port 81. The pump sucks the air through the needle. The needle is connected to the connection part 63, inserted in the connection part 63 through the supply port 81 and comes into contact with the tip end face 111a of the main body 111 of the container opening/closing valve 53. Then, when the needle is forcefully pushed into the connection part 63, the container opening/closing valve 53 is pushed in against a biasing force of the valve biasing spring 123. Then, the O-ring 125 is separated from the end face 83a of the protrusion 83 to open the supply port 81, and the container side communication path 109 is communicated with the pump of the air vent tool.

Then, when the pump is driven to remove the air in the container side communication path 109 through the needle, the ball 55 is moved toward the supply port 81 against a biasing force of the ball biasing spring 131, and the O-ring 133 is separated from the end wall 91 of the sub-main body 59. Then, the inflow port 95 is opened and the container side communication path 109 is communicated with the hollow space of the spout 37 and the inside of the bag body 35. The ink in the hollow space of the spout 37 and the inside of the bag body 35 enters in the container side communication path 109 through the inflow port 95, is flowed through the container side communication path 109 toward the air vent tool from the supply port 81.

When the ink is only discharged after the air is removed from the container side communication path 109 and the container side communication path 109 is filled with the ink only, the drive of the pump is stopped and the needle is detached from the connection part 63. Then, the container opening/closing valve 53 is biased by the valve biasing spring 123 toward the supply port 81, and the O-ring 125 comes into contact with the end face 83a of the protrusion 83. Additionally, the ball 55 is biased by the ball biasing spring 131 toward the inflow port 95, and the O-ring 133 comes into contact with the end wall 91 of the sub-main body 59. Thereby, the supply port 81 is closed by the container opening/closing valve 53 and the inflow port 95 is closed by the ball 55, and the container side communication path 109 is sealed with filled with the ink.

Figure 6:
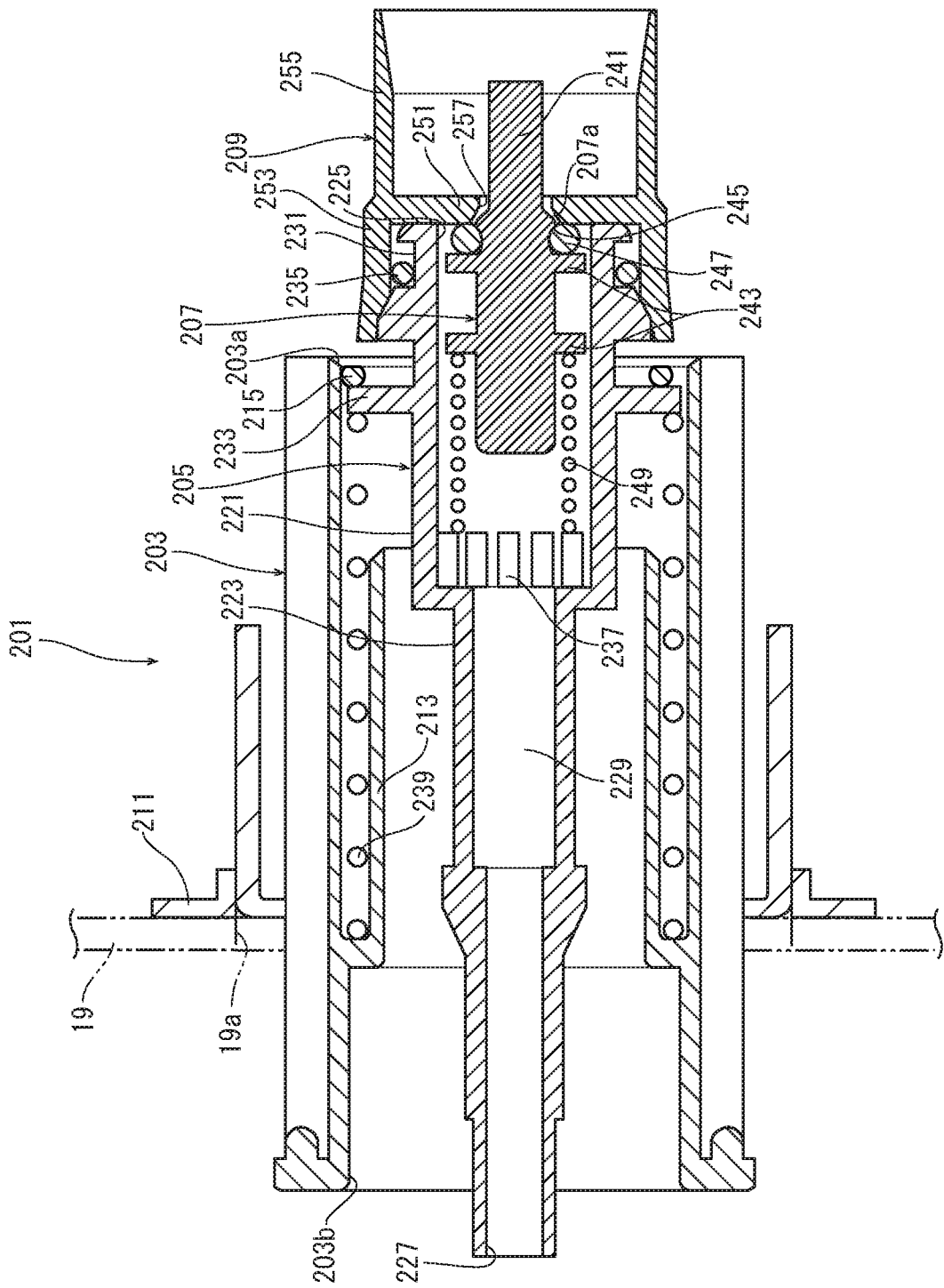
FIG. 6 is a cross sectional view showing a joint, in the printer according to the embodiment of the present disclosure.

Next, the coupling structure 200 to couple the ink container storage part 19 to the ink container 21 will be described. The coupling structure 200 includes the cap 39 of the ink container 21 and a joint attached to the receiving port 19a of the ink container storage part 19. With reference to FIG. 6, the joint will be described. FIG. 6 is a cross sectional view showing the joint.

The joint 201 includes a main cylinder 203, a movable cylinder 205 as a movable body stored in the main cylinder 203, a main body opening/closing valve 207 and a connection cylinder 209 attached to the movable cylinder 205.

The main cylinder 203 has an outer diameter capable of being stored in the receiving port 19a of the ink container storage part 19. The main cylinder 203 has an outside opening 203a on a side to be coupled to the cap 39 and an inside opening 203b on a side of the ink container storage part 19. On the approximately axial center portion of the outer circumferential face of the main cylinder 203, a flange 211 is fixed. The flange 211 is fixed to the ink container storage part 19 when the main cylinder 203 is stored in the receiving port 19a.

On the inner circumferential face of the main cylinder 203, a spring receiving portion 213 is formed along the circumferential direction. The spring receiving portion 213 has a flat ring-shaped end wall and a cylindrical wall. The end wall protrudes inwardly from a portion slightly closer to the inside opening 203b from the axial center portion, and the circumferential wall is separated from the inner circumferential face of the main cylinder 203 via a predetermined gap. The circumferential wall extends from the inner end of the end wall to a portion slightly closer to the outside opening 203a than the axial center portion. On the inner circumferential face of the main cylinder 203, a packing 215 is engaged with the end portion on a side of the outside opening 203a.

The movable cylinder 205 has a large diameter cylindrical part 221 and a small diameter cylindrical part 223 which are coaxially disposed, and has an outer diameter capable of being stored in the main cylinder 203 and a length longer than a length of the main cylinder 203. The hollow space of the movable cylinder 205 forms a main body side communication path 229 from an inflow port 225 on a side of the large diameter cylindrical part 221 to a supply port 227 on a side of the small diameter cylindrical part 223. The large diameter cylindrical part 221 has an outer diameter smaller than an inner diameter of the circumferential wall of the spring receiving portion 213.

On the outer circumferential face of the large diameter cylindrical part 221, a recess 231 and a flange 233 are formed. The recess 231 is annularly formed along the circumferential direction around the end portion on a side of the inflow port 225. In the recess 231, an O-ring 235 is stored. The flange 233 is annularly formed along the circumferential direction around the approximately axial center portion. The flange 233 has an outer diameter larger than an inner diameter of the circumferential wall of the spring receiving portion 213 of the main cylinder 203. Around the inner circumferential face of the large diameter cylindrical part 221, a plurality of ribs 237 is formed along the axial direction. The ribs 237 are formed via predetermined intervals in the circumferential direction around the end portion on a side of the small diameter cylindrical part 223.

The movable cylinder 205 is stored in the hollow space of the main cylinder 203 with the large diameter cylindrical part 221 on a side of the outside opening 203a and the inner diameter cylindrical part 223 on a side of the inside opening 203b. The flange 233 is movable along the axial direction of the main cylinder 203 between the spring receiving portion 213 and the packing 215. Between the flange 233 and the spring receiving portion 213, a movable cylinder biasing spring 239 as a second biasing member is disposed. The movable cylinder biasing spring 239 has a spring constant larger than a spring constant of the valve biasing spring 123 biasing the container opening/closing valve 53 of the cap 39. The movable cylinder biasing spring 239 biases the movable cylinder 205 toward the outside opening 203a until the flange 233 comes into contact with the packing 215. In the state, the tip portion (the inflow port 225) of the large diameter cylindrical part 221 is protruded from the outside opening 203a of the main cylinder 203.

The main body opening/closing valve 207 is an approximately columnar member, and has an outer diameter capable of being stored in the large diameter cylindrical part 221 of the movable cylinder 205. On one end face 207a (the tip end face) of the main body opening/closing valve 207, a protruding rod 241 is protruded coaxially with the main body opening/closing valve 207. The protruding rod 241 has a columnar shape having a diameter smaller than a diameter of the main body opening/closing valve 207. On the outer circumferential face of the main body opening/closing valve 207, two flanges 243 and a recess 245 are formed. The two flanges 243 are annularly formed around the axial center portion via a predetermined interval in the axial direction. The recess 245 is annularly formed between the two flanges 243 and the tip end face 207a. In the recess 245, an O-ring 247 is stored.

The main body opening/closing valve 207 is stored in the large diameter cylindrical part 221 of the movable cylinder 205 in a posture where the protruding rod 241 is protruded through the inflow port 225 of the movable cylinder 205. Between the flange 243 of the main body opening/closing valve 207 and the rib 237 of the large diameter cylindrical part 221, a valve biasing spring 249 as a first biasing member is disposed. The valve biasing spring 249 has a spring constant smaller than a spring constant of the valve biasing spring 123 of the cap 39. The valve biasing spring 249 biases the main body opening/closing valve 207 toward the inflow port 225. Even if the valve spring biasing 249 is mostly contracted, the protruding rod 241 of the main body opening/closing valve 207 is protruded from the inflow port 225.

The connection cylinder 209 has a circular end wall 251, a cylindrical circumferential wall 253 and a guide cylinder 255. The end wall 251 has a circular opening 257 at the center portion. The opening 257 has a diameter smaller than an inner diameter of the inflow port 225 of the large diameter cylindrical part 221 of the movable cylinder 205 and larger than a diameter of the protruding rod 241. The circumferential wall 253 is cylindrically formed on one end face of the end wall 251 around the circumference. The guide cylinder 255 is cylindrically formed on the other end face of the end wall 251 around the opening 257.

Into the circumferential wall 253 of the connection cylinder 209, the tip portion of the large diameter cylindrical part 221 of the movable cylinder 205 is inserted. The tip end face of the large diameter cylindrical part 221 comes into contact with the end wall 251 of the connection cylinder 209. The end wall 251 extends more inwardly than the inflow port 225, and reduces the diameter of the inflow port 225 to the diameter of the opening 257 substantially. In the following description, for explanation of convenience, the opening 257 is called the inflow port. The O-ring 235 stored in the recess 231 of the large diameter cylindrical part 221 seals a gap between the large diameter cylindrical part 221 and the connection cylinder 209. As described above, the main body opening/closing valve 207 is biased by the valve biasing spring 249, and the O-ring 247 comes into contact with the end wall 251 of the connection cylinder 209 and the protruding rod 241 is protruded into the guide cylinder 255 through the inflow port 257. Then, the main body opening/closing valve 207 closes the inflow port 257.

A coupling processing of the joint 201 to the cap 39 in the above described coupling structure 200 will be described with reference to FIG. 7 to FIG. 10. FIG. 7 to FIG. 10 are cross sectional views showing the coupling structure.

Figure 7:
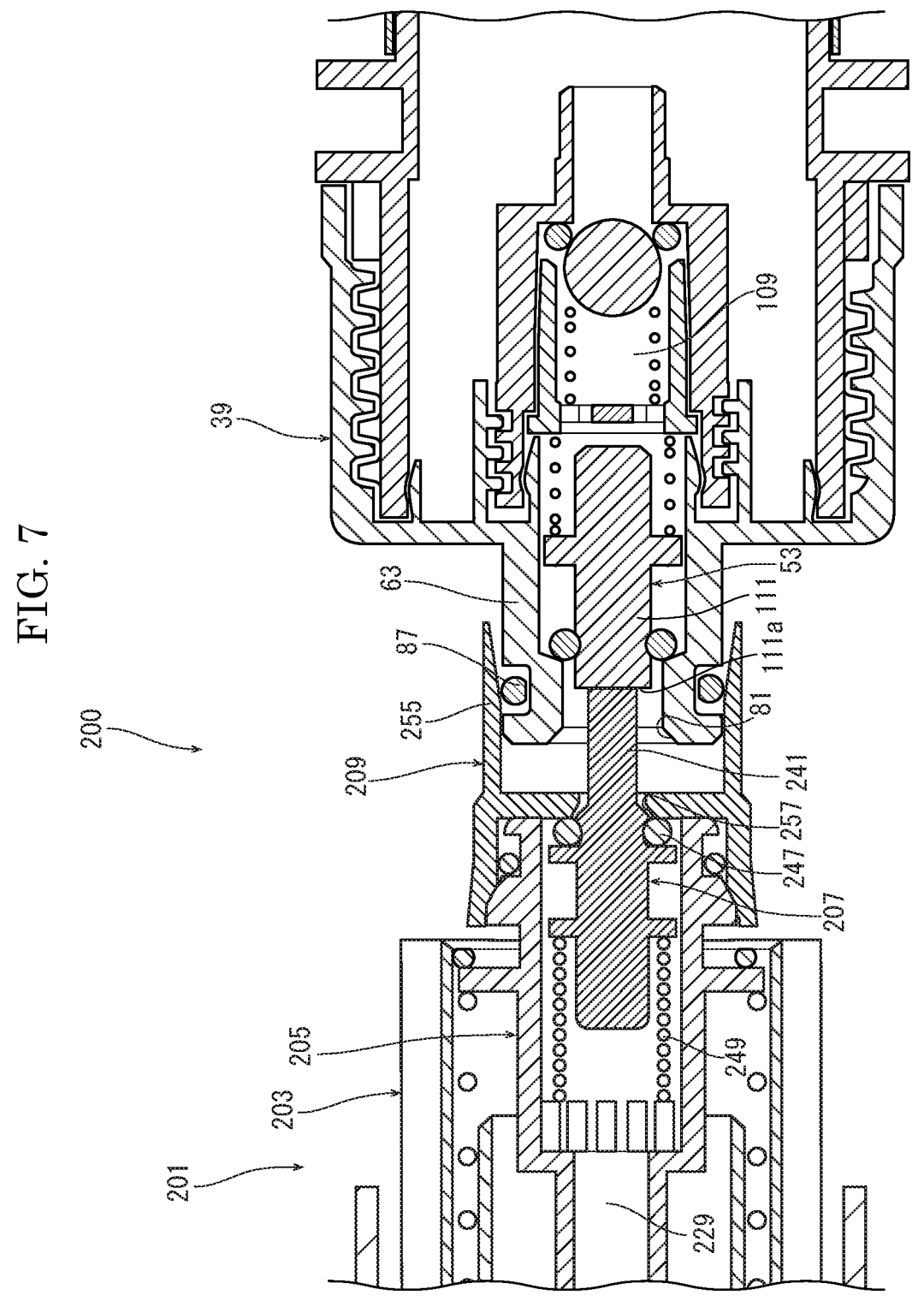

Firstly, as shown in FIG. 7, the connection part 63 of the cap 39 is inserted in the guide cylinder 255 of the joint 201. When the connection part 63 is pushed in along the guide cylinder 255, the tip end face of the protruding rod 241 of the main boy opening/closing valve 207 of the joint 201 comes into contact with the tip end face 111a of the main body 111 of the container opening/closing valve 53 of the cap 39. At this time, the O-ring 87 of the connection part 63 liquid-tightly seals the gap between the connection part 63 and the guide cylinder 255.

Figure 8:
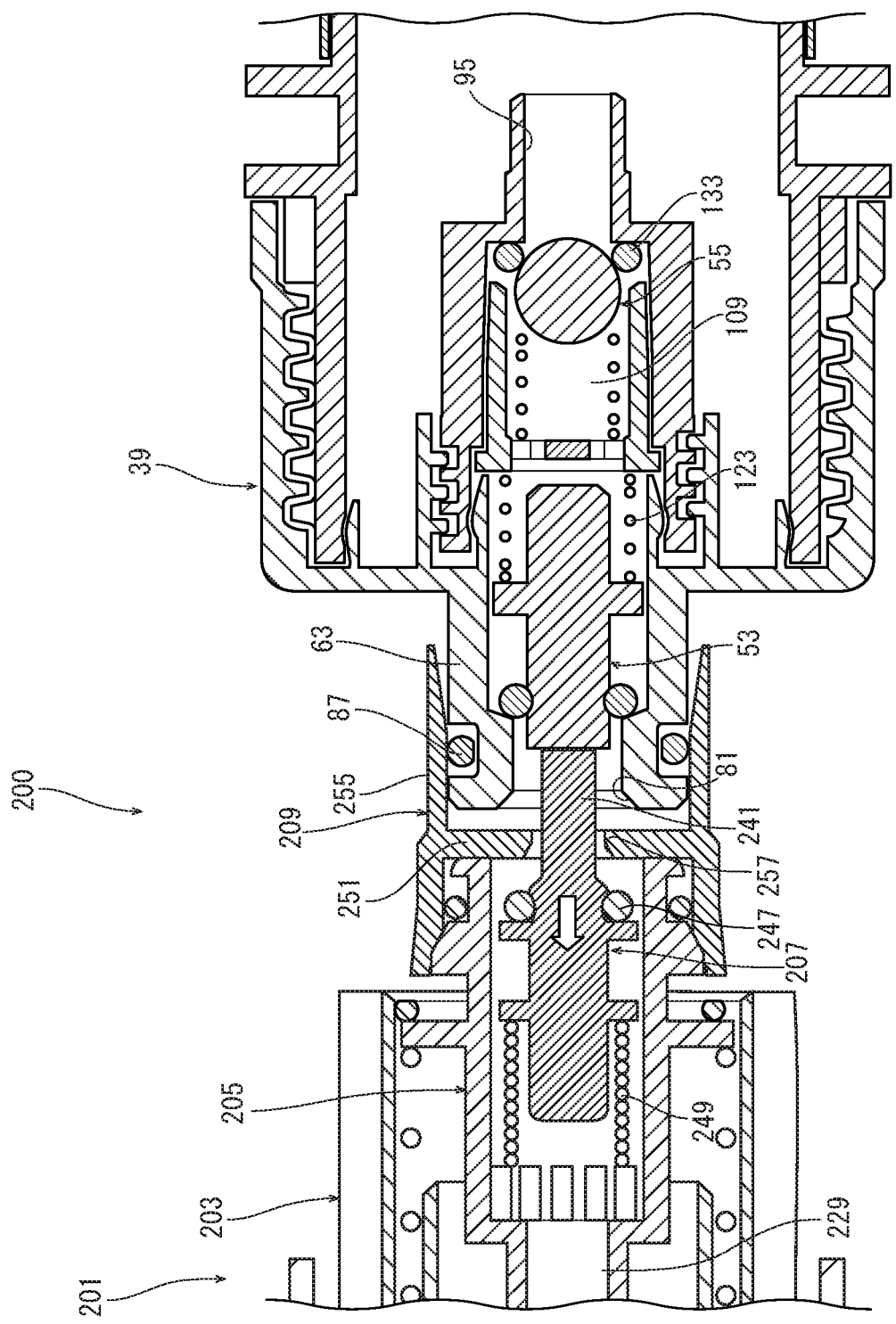
FIG. 8 is a cross sectional view showing the coupling structure (in a state where a main body opening/closing valve is pushed in) according to the embodiment of the present disclosure.

When the cap 39 is further pushed in, as shown in FIG. 8, the main body opening/closing valve 207 of the joint 201 is pushed in against the biasing force of the valve biasing spring 249 by the container opening/closing valve 53 of the cap 39. That is, because a spring constant of the valve biasing spring 249 which biases the main body opening/closing valve 207 of the joint 201 is smaller than a spring constant of the valve biasing spring 123 which biases the container opening/closing valve 53 of the cap 39, the main body opening/closing valve 207 of the joint 201 is pushed in preferentially (refer to a void arrow in FIG. 8). Then, the O-ring 247 is separated from the end wall 251 of the connection cylinder 209, and the inflow port 257 is opened. The main body opening/closing valve 207 is pushed in until the valve biasing spring 249 is mostly contracted. This restricts the pushing in of the main body opening/closing valve 207. As described above, even if the valve biasing spring 249 is mostly contracted, the protruding rod 241 is protruded through the inflow port 257.

Figure 9:
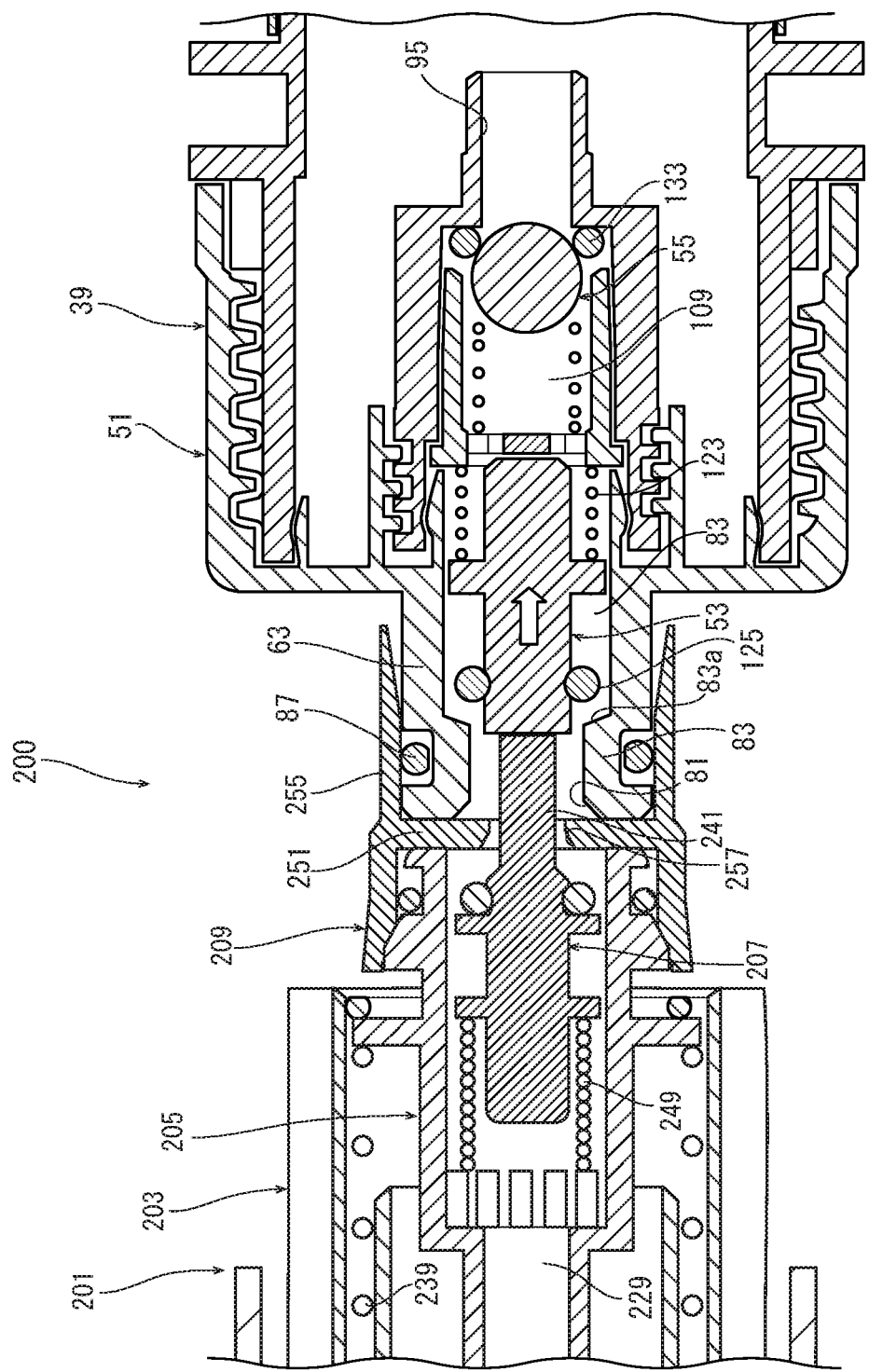
FIG. 9 is a cross sectional view showing the coupling structure (in a state where a container opening/closing valve is pushed in) according to the embodiment of the present disclosure.

When the cap 39 is further pushed in and the tip end face of the connection part 63 comes into contact with the end wall 251 of the connection cylinder 209, because the pushing in of the main body opening/closing valve 207 of the joint 201 is restricted, as shown in FIG. 9, the protruding rod 241 protruding through the inflow port 257 pushes the container opening/closing valve 53 in. Then, the container opening/closing valve 53 is pushed in with respect to the cap main body 51 against the biasing force of the valve biasing spring 123 (refer to a void arrow shown in FIG. 9). That is, because a spring constant of the movable cylinder biasing spring 239 is larger than a spring constant of the valve biasing spring 123 of the cap 39, when the protruding rod 241 pushes the container opening/closing valve 53 in, the movable cylinder 205 is not moved backward while the container opening/closing valve 53 is pushed in preferentially. As a result, the O-ring 125 is separated from the end face 83a of the protrusion 83, and the supply port 81 of the connection part 63 is opened.

As described above, the supply port 81 of the cap 39 and the inflow port 257 of the joint 201 are opened, and the container side communication path 109 of the cap 39 is communicated with the main body side communication path 229 of the joint 201. Then, the ink stored in the container side communication path 109 of the cap 39 is flowed into the main body side communication path 229 of the joint 201 through the inflow port 257 from the supply port 81. Because the inflow port 95 of the container side communication path 109 of the cap 39 is closed by the ball 55, the ink is not flowed in the container side communication path 109.

Figure 10:
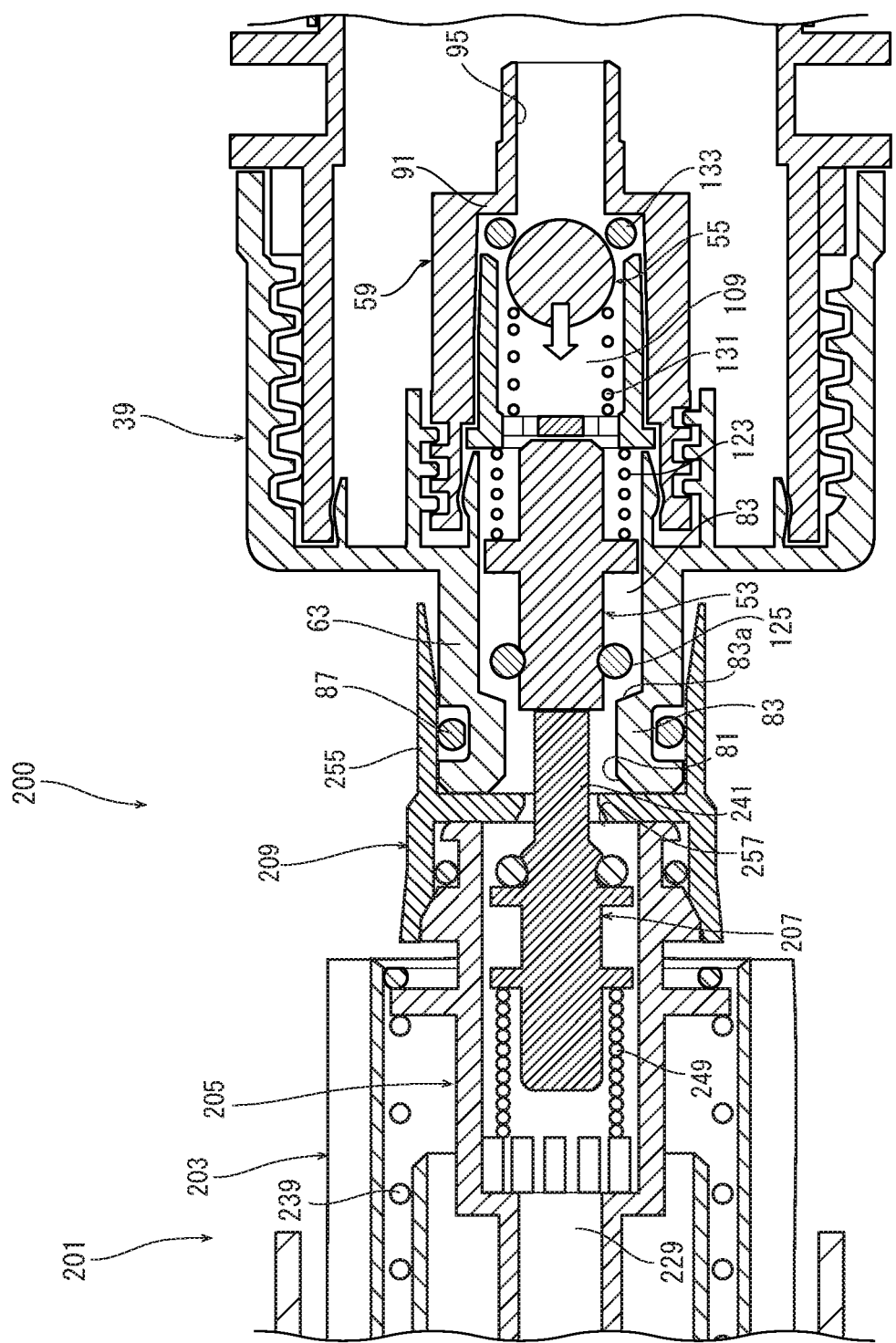
FIG. 10 is a cross sectional view showing the coupling structure (in a state where communication paths of the joint and the cap is communicated with the ink pack) according to the embodiment of the present disclosure.

After that, the pump 25 (refer to FIG. 1) is driven. Then, as shown in FIG. 10, in the same manner as the above described ink filling operation, the ball 55 is moved in a direction separate from the inflow port 95 against the biasing force of the ball biasing spring 131 (refer to a void arrow shown in FIG. 10), the O-ring 133 is separated from the end wall 91 of the sub-main body 59, and the inflow port 95 is opened. Then, the ink stored in the ink pack 33 enters the container side communication path 109 of the cap 39, is flowed in the main body side communication path 229 of the cap 39 through the inflow port 257 from the supply port 81 and suppled through the supply port 227 to the ink supplying path 23 (refer to FIG. 6).

The case 31 of the ink container 21 and the ink container storage part 19 are non-detachably coupled to each other by a lock mechanism (not shown) when the cap 39 is coupled to the joint 201 by the coupling structure 200 as described above. The lock mechanism is configured to be released when the ink container 21 (the case 31) is further pushed in toward the ink container storage part 10.

Figure 11:
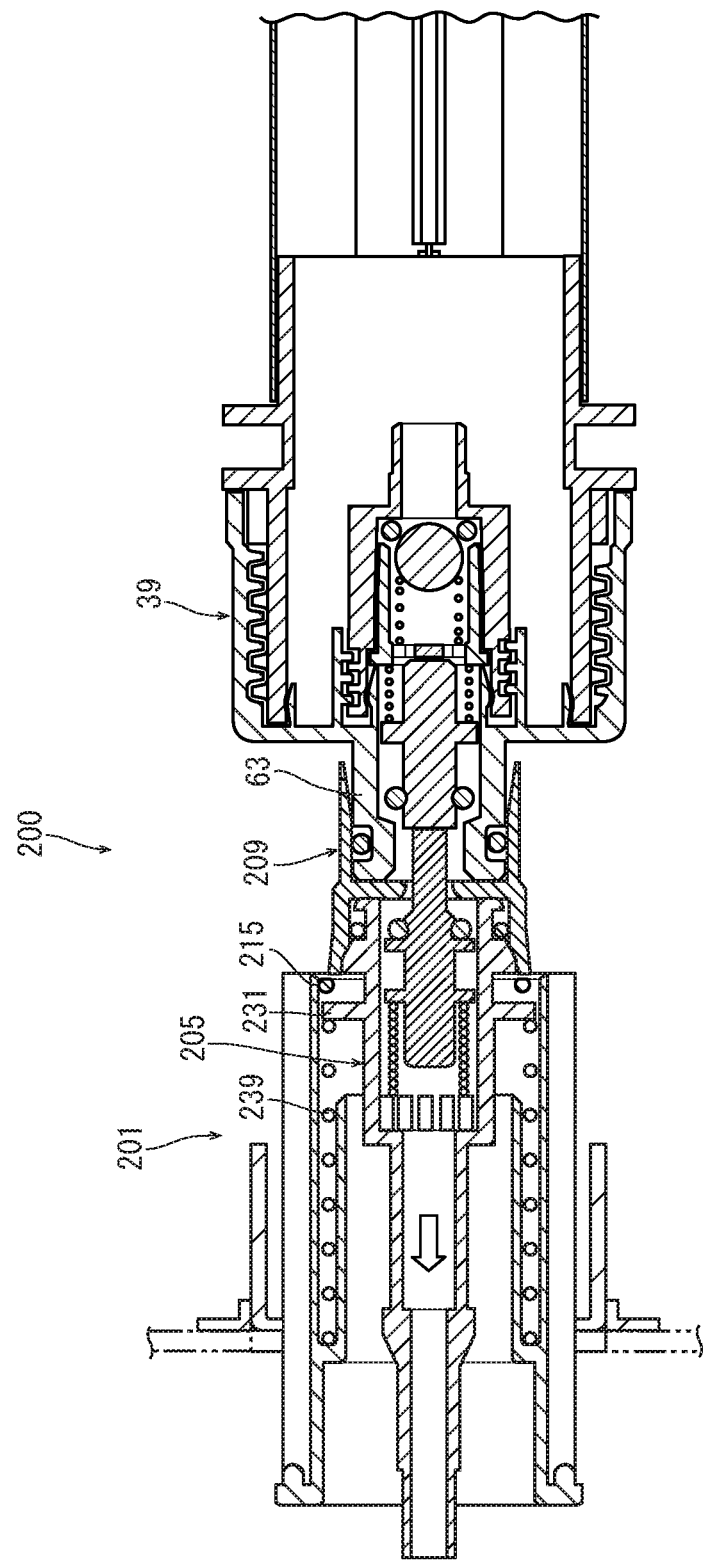
FIG. 11 is a cross sectional view showing the coupling structure (in a state where a lock mechanism is released) according to the embodiment of the present disclosure.

When the lock mechanism is released to detach the ink container 21 from the ink container storage part 19, the ink container 21 is forcefully pushed in toward the ink container storage part 19 with a relatively strong force. Then, as shown in FIG. 11, the connection part 63 of the cap 39 pushes the connection cylinder 209 of the joint 201 in, and the movable cylinder 205 is pushed in via the connection cylinder 209. Because the main cylinder 203 is fixed to the ink container storage part 19, the movable cylinder 205 is moved backward with respect to the main cylinder 203 against the biasing force of the movable cylinder biasing spring 239. Then, the lock mechanism is released.

As described above, according to the coupling structure 200 of the present disclosure, when the cap 39 of the ink container 21 is pushed in the joint 201 of the ink container storage part 19, the gap between the cap 39 and the joint 201 are liquid-tightly sealed firstly. Then, after the inflow port 257 of the joint 201 is opened, the supply port 81 of the cap 39 is opened (the order of the sealing of the cap 39 with the joint 201 and the opening of the inflow port 257 may be reversed). Then, the communication path 109 of the ink container 21 is communicated with the communication path 229 of the joint 201 without leakage of the ink, and it becomes possible to supply the ink from the ink container 21 to the ink supply path 23. Accordingly, it becomes possible to connect the ink container 21 to the recording head 15, which is a supply target, with a simple operation. Furthermore, because an operation for breaking a film is not needed when the ink container 21 is connected to the recording head 15, it becomes possible to prevent a foreign matter from being generated or mixed with the ink.

Additionally, it becomes possible to push in the movable cylinder 205 with respect to the main cylinder 203 while the cap 39 and the joint 201 communicated with each other. Accordingly, the coupling structure 200 may be suitably applied to a configuration that after the cap 39 and the joint 201 are non-detachably coupled by the lock mechanism, the ink container 21 is further pushed in to release the lock mechanism, as with the printer 1 of the present embodiment.

In the ink container 21, the container opening/closing valve 53 comes into contact with the protrusion 83 of the connection part 63 with a liquid pressure of the ink stored in the container side communication path 109. The ink is hardly changed in volume even if a pressure is added because it is liquid. Accordingly, owing to the liquid pressure of the ink, it becomes possible to seal the container side communication path 109 surely. In the present embodiment, the O-ring 125 of the container opening/closing valve 53 comes into contact with protrusion 83. At this time, the O-ring 125 is deformed in a wedge-shape to bite between the main body 111 of the container opening/closing valve 53 and the end face 83a of the protrusion 83 so that the sealing performance can be further improved. However, the main body 111, but not the O-ring 125, may directly come into contact with the protrusion 83.

As described above, unless the container opening/closing valve 53 is pushed in with a strong force like a case where the ink container 21 is attached to the ink container storage part 19, the container opening/closing valve 53 is not moved. In other words, the container opening/closing valve 53 is not moved by such a force generated when the ink container 21 is vibrated during transportation or external pressure is applied to the container opening/closing valve 53 so that it becomes possible to prevent the ink leakage.

The end face 83a of the protrusion 83 with which the O-ring 125 of the container opening/closing valve 53 comes into contact is formed such that a tapered angle $\alpha$ is from 60° to 120°. A shift distance of the O-ring 125 for forming a predetermined space between the O-ring 125 and the end face 83a is smaller in a case of a large tapered angle $\alpha$ than in a case of a small tapered angle $\alpha$. That is, as a tapered angle $\alpha$ is larger, it becomes possible to form the space with a small shift distance. On the other hand, the O-ring 125 is deformed in a wedge-shape to bite between the main body 111 of the container opening/closing valve 53 and the end face 83a of the protrusion 83. At this time, as a tapered angle $\alpha$ is smaller, a degree of the wedge-shaped deformation of the O-ring 125 becomes larger to heighten the sealing performance owing to the deformation of the O-ring 125. That is, a tapered angle $\alpha$ is preferably set such that the sealing performance of the O-ring 125 is kept while the shift distance of the O-ring 125 is as small as possible. For example, in a case of a tapered angle $\alpha$ of 130°, the ink leakage occurs. On the other hand, in case of a tapered angle $\alpha$ smaller than 60°, an ink supplying failure occurs. Then, a tapered angle $\alpha$ of 60° to 120° makes it possible to prevent the ink leakage and to supply the ink to the supply target with a suitable force.

When the ink in the ink pack 33 is consumed and the ink pack 33 is replaced, the ink container 21 is drawn from the container storage part 19. Then, the main body opening/closing valve 207 of the joint 201 is separated from the connection part 63, the force for pushing the container opening/closing valve 53 in is released, the container opening/closing valve 53 is biased by the valve biasing spring 123 to come into contact with the protrusion 83, and then the supply port 81 is closed. After that, the ink pack 33 is detached from the case 31. At this time, the ink leakage does not occur because the supply port 81 is closed by the container opening/closing valve 53. Then, the new ink pack 33 is stored in the case 31.

Although the present disclosure described the specific embodiment, the present disclosure is not limited to the embodiment. It is to be noted that one skilled in the art can modify the embodiment without departing from the scope and spirit of the present disclosure.

The invention claimed is:

1. A coupling structure which couples an ink container to a supply target to which an ink is suppled from the ink container, the coupling structure comprising:
   a cap which closes a spout of the ink container; and
   a joint attached to a receiving port of the supply target,
   wherein the cap includes:
   a container side communication path communicated with a supply port through which the ink is supplied to the supply target; and
   a container opening/closing valve which opens and closes the supply port,
   the joint includes:
   a main body side communication path communicated to an inflow port in which the ink is flowed from the ink container;
   a main body opening/closing valve which opens and closes the inflow port and is protruded to a side of the ink container closer than the inflow port; and
   a first biasing member which biases the main body opening/closing valve to a side of the ink container,
   the main body opening/closing valve is protruded to a side of the ink container closer than the inflow port even if the first biasing member is mostly contracted,
   wherein when the cap is coupled to the joint, the main body opening/closing valve comes into contact with the container opening/closing valve, and is pushed in against a biasing force of the first biasing member to open the inflow port,
   after the main body opening/closing valve is pushed in until a state where the first biasing member is mostly contracted,
   the main body opening/closing valve pushes the container opening/closing valve in to open the supply port, and
   the container side communication path is communicated with the main body side communication path such that the ink container is coupled to the supply target.

2. The coupling structure according to claim 1, wherein the joint includes:
   a movable body containing the main body side communication path, the main body opening/closing valve and the first biasing member; and
   a second biasing member which biases the movable body to a side of the ink container.

3. The coupling structure according to claim 1, wherein the cap includes a valve biasing spring which biases the container opening/closing valve to a side of the supply port,
   a spring constant of the first biasing member is smaller than a spring constant of the valve biasing spring, and
   a spring constant of the second biasing member is larger than a spring constant of the valve biasing spring.

4. The coupling structure according to claim 1, wherein the cap includes:
   a connection part having the supply port; and
   an O-ring disposed around an outer circumferential face of the connection part, and
   the joint includes a guide cylinder into which the connection part is inserted,
   wherein when the cap is coupled to the joint, before the main body opening/closing valve comes into contact with the container opening/closing valve, the connection part is inserted into the guide cylinder and the O-ring liquid-tightly seals a gap between the connection part and the guide cylinder.

5. The coupling structure according to claim 1, wherein the cap includes:
   a backflow prevention valve which prevent a backflow of the ink from the container side communication path to the ink container; and
   an annular protrusion against which the container opening/closing valve is pressed by a liquid pressure of the ink stored in the container side communication path between the backflow prevention valve and the container opening/closing valve,
   wherein the protrusion has an end face with which the container opening/closing valve comes into contact, the end face formed to be tapered toward the supply port, and
   imaginary lines extending the end face toward the supplying port in a cross section along a communication direction of the container side communication path are crossed at a tapered angle from 60° to 120°.

6. An image forming apparatus comprising:
   the ink container and the supply target which are coupled to each other by the coupling structure according to claim 1; and
   an image forming part which forms an image using the ink supplied to the supply target from the ink container.

* * * * *